2,927,049

FLUXING METHOD AND COMPOSITION

Rene D. Wasserman, Stamford, Conn., and Joseph Quaas, Island Park, N.Y., assignors to Eutectic Welding Alloys Corporation, Flushing, N.Y., a corporation of New York No Drawing. Application December 27, 1956
Serial No. 630,775

13 Claims. (Cl. 148—25)

This invention relates to a method of fluxing and compositions for use in conjunction with brazing, and more particularly relates to such a method and composition which leaves the surface of the completed joint substantially free of residue.

Fluxes heretofore used in conjunction with brazing have been employed in rather substantial quantities to form an effective blanket over the molten metal. This blanket prevents oxidation and combines with the molten metal to remove impurities. A voluminous flux blanket, however, conceals the joint from the operator and generally makes his task more difficult to carry out efficiently. Furthermore, these heretofore known fluxes deposit upon the completed joint slag whose removal is an expensive and time-consuming operation even when friable slags are formed.

An object of this invention is to provide a method of fluxing and a composition therefor which may be effectively applied in small quantites and which volatilizes during the brazing process in order ot minimize interference with the operator and to eliminate the deposition of slag upon the completed joint.

In accordance with this invention, a joint to be brazed is fluxed by applying a thin film of a dilute solution containing a boron ester or a mixture capable of forming it which volatilizes upon the application of heat. This reaction forms a gaseous blanket over the brazing area which acts as a flux and prevents oxidation during the brazing process. After the completion of the brazing operation, the gaseous blanket dissipates and leaves the completed joint substantially free of slag or residue.

This flux may be effectively formed, for example, by combination of a boric acid and an alcohol. Desirable alcohols are monohydric alcohols such as amyl alcohol; polyhydric alcohols, such as dihydric ethylene glycol; and trihydric glycerol, otherwise known as glycerine. Glycerine, however, leaves a slight residue which makes it slightly less desirable as a constituent.

The term "boric acid" as used herein, is meant to include acid-forming boron oxides, such as anhydrous boron trioxide ($B_2O_3$) and its hydrates such as orthoboric ($H_3BO_3$), metaboric ($HBO_2$) and tetraboric $H_2B_4O_7$) acids. As a practical matter, the more stable orthoboric acid and the anhydride ($B_2O_3$) are the most applicable constituents.

Certain boron esters may also be directly utilized in practicing this invention. Examples of such esters are as follows: trimethyl borate; tri-N-butyl borate; tri-N-amyl borate; tri-N-octyl borate; tri-hexylene glycol borate; tri-O-cresyl borate and tri-(2-cyclohexylcyclohexyl) borate. Another useful ester is fully described in U.S. Letters Patent 1,953,741.

In order to apply these fluxes, however formed, in a film or mist which is slight enough to leave no apparent residue upon application of heat, they are desirably diluted with a suitable solvent, water for example. The degree of dilution may vary from as little as one part by weight of water to two parts by weight of active constituents, up to as much as 100 parts by weight of water to one part by weight of active constituents. A convenient mixture of commercially available ester and water is, for example, three parts by weight of water to one part by weight of ester.

An inhibiting substance, such as oil, is added to the ester and water solution in order to prevent reactions which reduce the shelf life of the mixtures, for example, by forming precipitates which prevent effective fluxing. The exact manner in which this inhibiting substance operates is not known, but it is suspected that its presence prevents hydrolyzing of the ester before its use. This greatly enhances the shelf life of the solutions. An effective inhibiting substance is, for example, a petroleum base oil such as mineral oil.

This novel flux may also, for example, be formulated of constituents combined within the ranges of percentages by weight as set forth in the following:

| Constituent | Ranges of Percentages by weight |
|---|---|
| Boric acid | 15 to 92 |
| Alcohol | 8 to 85 |

An inhibiting substance ranging from 2 to 10% by weight of the above formulation may be added to the above formulation to prevent harmful reactions from occuring when diluted with water, such as, formation of deleterious precipitates.

A formulation including an inhibitor may be prepared in the manner as follows:

| Constituent | Ranges of Percentages by weight |
|---|---|
| Boric acid | 15 to 90 |
| Alcohol | 8 to 50 |
| Inhibiting compound | 2 to 10 |

A preferred formulation of an efficient flux of this type is as follows:

| Constituent | Percentages by weight | |
| | Preferred range | Preferred example |
|---|---|---|
| Orthoboric acid | 65–75 | 70 |
| Amyl alcohol | 20–30 | 25 |
| Mineral Oil | 3–7 | 5 |

Monohydric alcohols, such as methyl, amyl, butyl and octyl alcohol are particularly desirable because of their relative abundance and low cost. Members of the glycol family, particularly alkylene glycols, such as ethylene glycol, propylene glycol and trimethylene glycol can also be used as well as a trihydric alcohol, such as glycerol.

A formulation incorporating alkylene glycol is as follows:

|  | Percent |
|---|---|
| Orthoboric acid | 65 to 75 |
| Alkylene glycol | 2 to 30 |
| Mineral oil | 3 to 7 |

The excellent fluxing characteristics of this invention are due to the fact that the presence of a boron ester during the brazing process forms a gas having unique properties which covers the brazing area. This provides the excellent fluxing characteristics of boron in a protective gaseous blanket which also prevents oxidation. When boric anhydride, otherwise known as boron trioxide ($B_2O_3$) is used, it is believed that polymeric boron esters are formed.

While this flux can be used in conjunction with rods of filler metal representative of many alloy systems, it is particularly well suited for use in conjunction with copper-zinc-nickel, copper-zinc, and copper-zinc-manganese as well as other brass and bronze filler rods.

To facilitate application, a typical formulation of the boric acid-alcohol type flux is diluted with up to 100 times for example, its own weight of distilled water. This diluted flux may be easily applied prior to the brazing process by brushing or spraying. It may be conveniently sprayed, for example, by use of a conventional polyethylene-squeeze bottle type applicator having a rather small orifice opening.

The solution may be applied a considerable time before brazing, several days for example, and allowed to dry. This does not interfere with the excellent characteristics of the flux.

The function of the inhibiting substance is not fully understood, but it is believed that the addition of a petroleum base oil, such as mineral oil for example, to an ester solution prevents the water in the dilute solution from hydrolyzing the ester and, therefore, enhances the storage and useful life of the flux. When this inhibitor is mixed with alcohol and boric acid mixtures, deleterious reactions are inhibited during storage which is the basic reason for its use regardless of the exact operative mechanism.

What is claimed is:

1. A brazing flux consisting essentially of a mixture of a boron ester and water, said mixture being capable of substantially completely volatilizing upon application of heat during the brazing process, said ester and said water respectively being present in the ratio of parts by weight from 2 to 1 up to 1 to 100, and a minor amount of an inhibiting mineral oil ranging from 2 to 10 percent by weight of said boron ester being added to enhance the shelf life of said flux.

2. A brazing flux as set forth in claim 1 wherein said boron ester and said water are respectively present in the ratio of 1 to 3 parts by weight.

3. A brazing flux consisting essentially of the designated constituents in the following ranges of percents by weight:

| | Percent |
|---|---|
| Boric acid | 15 to 92 |
| Alcohol | 8 to 85 | said formulation being diluted with water in the ratio of parts by weight of formulation to parts by weight of water of from 2 to 1 respectively up to 1 to 100 respectively, a minor amount of inhibiting mineral oil ranging from 2 to 10 percent by weight of said formulation less water being added to the solution to improve its shelf life, and said solution being reacted by the application of heat to form an ester solution which volatilizes to flux a joint to be brazed upon which it is applied and leaves no substantial discernible flux residue.

4. A brazing flux as set forth in claim 3 wherein said alcohol is selected from the group consisting of monohydric, dihydric and trihydric alcohols.

5. A brazing flux as set forth in claim 3 wherein said boric acid is orthoboric acid ($H_3BO_3$).

6. A brazing flux as set forth in claim 3 wherein said boric acid is the anhydride, $B_2O_3$.

7. A brazing flux consisting essentially of the following constituents in percent by weight forming a solution capable of volatilizing upon application of heat:

| | Percent |
|---|---|
| Boric acid | 15 to 90 |
| Alcohol | 8 to 50 |
| Inhibiting mineral oil | 2 to 10 | said formulation being diluted with water in the ratio of parts by weight of boric acid and alcohol to parts by weight of water of from 2 to 1 respectively up to 1 to 100 respectively, and said solution being reacted by the application of heat to form an ester solution which volatilizes to flux a joint to be brazed upon which it is applied and leaves no substantial discernible flux residue.

8. A brazing flux consisting of the constituents as follows in the designated ranges of percentages by weight forming a solution capable of volatilizing upon application of heat:

| | Percent |
|---|---|
| Orthoboric acid | 65 to 75 |
| Alkylene glycol | 2 to 30 |
| Mineral oil | 3 to 7 | said formulation being diluted with water in the ratio of parts by weight of orthoboric acid and alkylene glycol to parts by weight of water of from 2 to 1 respectively up to 1 to 100 respectively, and said solution being reacted by the application of heat to form an ester solution which volatilizes to flux a joint to be brazed upon which it is applied and leaves no substantial discernible flux residue.

9. A brazing flux consisting of the constituents as follows in the designated percentages by weight forming a solution capable of volatilizing upon application of heat:

| | Percent |
|---|---|
| Orthoboric acid | 70 |
| Amyl alcohol | 25 |
| Mineral oil | 5 | said formulation being diluted with water in the ratio of parts by weight of orthoboric acid and amyl alcohol to parts by weight of water of from 2 to 1 respectively up to 1 to 100 respectively, and said solution being reacted by the application of heat to form an ester solution which volatilizes to flux a joint to be brazed upon which it is applied and leaves no substantial discernible flux residue.

10. A brazing flux as set forth in claim 9 wherein said formulation is diluted with water in the ratio of one part by weight of formulation to 100 parts by weight of water.

11. A brazing flux consisting essentially of the constituents as follows in the designated ranges of percentage by weight forming a solution capable of volatilizing upon application of heat:

| | Percent |
|---|---|
| Boric acid | 15 to 90 |
| Ethylene glycol | 8 to 50 |
| Petroleum base oil | 2 to 10 | said formulation being diluted with water in the ratio of parts by weight of orthoboric acid and ethylene glycol to parts by weight of water of from 2 to 1 respectively up to 1 to 100 respectively, and said solution being reacted by the application of heat to form an ester solution which volatilizes to flux a joint to be brazed upon which it is applied and leaves no substantial discernible flux residue.

12. The method of fluxing a joint prior to brazing which comprises the steps of mixing a boron ester and water respectively in the ratio in parts by weight from 2 to 1 up to 1 to 100, adding a minor amount of an inhibiting mineral oil ranging from 2 to 10 percent by weight of said boron ester, applying a thin film of the resultant solution upon said joint, and applying heat to volatilize said solution thereby fluxing said joint and leaving substantially no discernible flux residue.

13. The method of fluxing a joint prior to brazing which comprises the steps of mixing a formulation ranging in percentages by weight of 15 to 92% boric acid and 8 to 85% of alcohol, diluting said formulation with water in the ratio in parts by weight of formulation to parts by weight of water respectively of from 2 to 1 up to 1 to 100, adding a minor amount of an inhibiting mineral oil ranging from 2 to 10 percent by weight of said formulation less water, applying a thin film of the resultant solution upon said joint, and applying heat to volatilize said solution thereby fluxing said joint and leaving substantially no discernible flux residue.

References Cited in the file of this patent

UNITED STATES PATENTS

| | | |
|---|---|---|
| 2,194,920 | Vaughn et al. | Mar. 26, 1940 |
| 2,277,064 | Bialosky et al. | Mar. 24, 1942 |

FOREIGN PATENTS

| | | |
|---|---|---|
| 21,678 | Great Britain | June 13, 1907 |
| 491,008 | Great Britain | Aug. 24, 1938 |